Sept. 9, 1941.  W. W. LASKER  2,255,670
TABULATING MECHANISM
Filed Aug. 7, 1937  9 Sheets-Sheet 1

FIG. 1.

INVENTOR
W. W. LASKER, DECEASED
W. W. LASKER, JR., EXECUTOR
BY H. A. Sparks
ATTORNEY Sept. 9, 1941.  W. W. LASKER  2,255,670
TABULATING MECHANISM
Filed Aug. 7, 1937  9 Sheets—Sheet 2

FIG. 2.

INVENTOR
W. W. LASKER, DECEASED
W. W. LASKER, JR., EXECUTOR
BY *W. A. Spark*
ATTORNEY

Sept. 9, 1941.                W. W. LASKER                2,255,670
                        TABULATING MECHANISM
              Filed Aug. 7, 1937                9 Sheets-Sheet 3

INVENTOR
W.W. LASKER, DECEASED
W.W. LASKER, JR., EXECUTOR
BY  H. A. Spark
              ATTORNEY Sept. 9, 1941.   W. W. LASKER   2,255,670
TABULATING MECHANISM
Filed Aug. 7, 1937   9 Sheets-Sheet 4

FIG.6.

INVENTOR
W.W. LASKER, DECEASED
W.W. LASKER, JR., EXECUTOR
BY *W. A. Sparks*
ATTORNEY

FIG.7.

Sept. 9, 1941.  W. W. LASKER  2,255,670
TABULATING MECHANISM
Filed Aug. 7, 1937  9 Sheets-Sheet 6

FIG. 8.

INVENTOR
W.W. LASKER, DECEASED
W.W. LASKER, JR., EXECUTOR
BY *W. A. Sparks*
ATTORNEY Sept. 9, 1941.  W. W. LASKER  2,255,670

TABULATING MECHANISM

Filed Aug. 7, 1937  9 Sheets-Sheet 7

INVENTOR
W.W. LASKER, DECEASED
W.W. LASKER, JR., EXECUTOR

BY W. A. Sparks
ATTORNEY

Sept. 9, 1941. W. W. LASKER 2,255,670
TABULATING MECHANISM
Filed Aug. 7, 1937 9 Sheets-Sheet 8

FIG.10.

INVENTOR
W.W.LASKER, DECEASED
W.W.LASKER, JR., EXECUTOR
BY
ATTORNEY

Sept. 9, 1941.　　　W. W. LASKER　　　2,255,670
TABULATING MECHANISM
Filed Aug. 7, 1937　　　9 Sheets-Sheet 9

INVENTOR
W. W. LASKER, DECEASED
W. W. LASKER, JR., EXECUTOR
BY　*W. A. Sparks*
ATTORNEY Patented Sept. 9, 1941

2,255,670

UNITED STATES PATENT OFFICE 2,255,670

TABULATING MECHANISM

William W. Lasker, deceased, late of Brooklyn, N. Y., by William W. Lasker, Jr., executor, Brooklyn, N. Y., assignor to Remington Rand Inc., Buffalo, N. Y., a corporation of Delaware Application August 7, 1937, Serial No. 157,885

4 Claims. (Cl. 235—61.9)

This invention relates to record controlled tabulating machines, and particularly to a printing hammer control mechanism for such machines.

This application is a continuation in part of a co-pending application of W. W. Lasker, S. N. 684,438, filed August 9, 1933, now Patent No. 2,185,258, issued January 1, 1940, and contains certain modifications disclosed in a later application of W. W. Lasker, S. N. 693,541, filed October 14, 1933.

In the preparation of report sheets from perforated record cards, two general types of tabulation, commonly known as "listing" and "non-listing," are employed. The term "listing" is applied to the type of tabulation in which certain designative data and one or more items of quantitative data contained in each card of a run are of particular significance, and are to appear on the report sheet, whereas, the term "non-listing" is applied to the type of tabulation in which the cards of a run are divisible into several groups and only the common designation and the total of each group are printed on the report sheet. In the first case, the designative and quantitative data contained in each card is printed during the accumulating cycles, and the totals of the quantitative data are printed during the total taking cycles. The designative data is printed on the same line with the associated quantitative data. In the second case, the common designation of each group of cards is printed on the same line with the totals of the associated quantitative data.

Due to the widely diversified uses to which a tabulator may be adapted, it has become customary to so construct these machines that they may be used to prepare various types of report sheets simply by substituting different translator units. Thus, in the preparation of one type of report, a given tabulator unit may be used for tabulating designative data, whereas, in the preparation of another type of report, the same unit may be used for tabulating quantitative data, and, in either case, it may be required that the unit be controllable for listing or non-listing. In Powers or similar types of tabulating and accounting machines, in which the printing hammers of each tabulating unit are released to effect printing during each accumulating and total taking cycle during listing and non-listing operations, means are provided to control the operation of the printing hammers, during each of the four different conditions referred to above, as follows:

1. When non-listing and the unit is used for tabulating designative data, the printing hammers are controlled to print the common designation from the first card of each group, to prevent printing from the remaining cards of the group, and to prevent printing during total taking cycles;

2. When non-listing and the unit is used for tabulating quantitative data, the control mechanism is set to prevent printing during accumulating cycles, and to permit the printing of the totals of the quantitative data during total taking cycles;

3. When listing and the unit is used for tabulating designative data, the printing hammers are set to permit printing during accumulating cycles, and to prevent printing during total taking cycles; and 4. When listing and the unit is used for tabulating quantitative data, the mechanism is set to permit printing during accumulating and total taking cycles.

The principal object of the present invention is to improve the means for controlling the printing mechanism of a tabulating unit whereby said unit may be used for tabulating either designative or quantitative data during listing and non-listing operations.

Another object of the present invention is to improve the means for controlling the printing mechanism of a tabulating unit whereby, in a machine having a plurality of tabulating units, each of said units may be arbitrarily controlled for tabulating either quantitative or designative data during listing and non-listing operations.

Further objects of the invention will be made apparent in the course of the specification.

Two distinct forms of the invention are illustrated in the accompanying drawings in which.

Both forms of the invention are shown applied to a Powers punched card controlled tabulator. The Powers tabulator has been manufactured and in extensive commercial use for many years, and an early form of this tabulator is shown in a patent to James Powers No. 1,245,502, issued Nov. 6, 1917.

Figure 1:
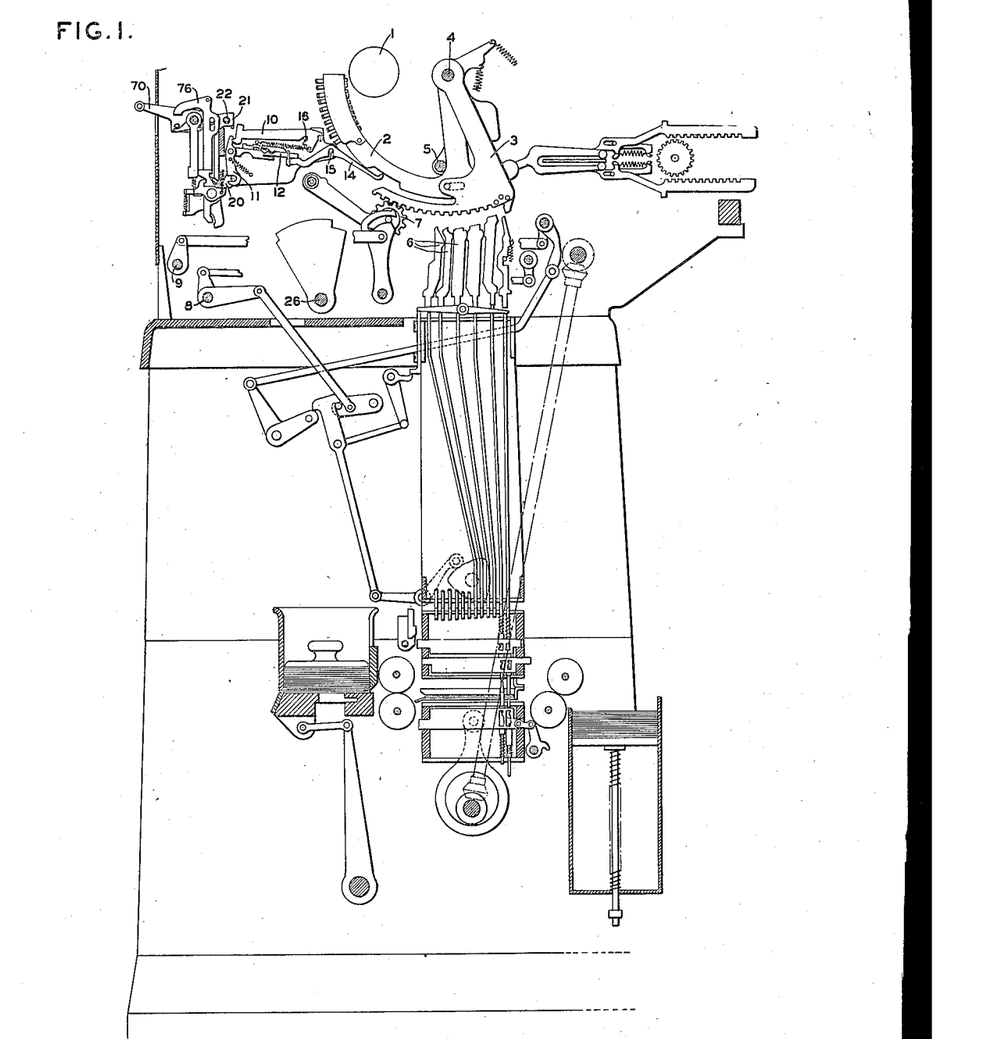
Fig. 1 is a schematic sectional elevation of a Powers tabulator equipped with one form of the invention.

In all its various forms the Powers tabulator has been provided with an upper or computing portion which includes a platen 1 (Fig. 1) and a number of tabulating units arranged side by side across the machine, each including a plurality of spring-urged type carriers 2 and gear sectors 3, pivotally mounted on shaft 4, which are arranged to be oscillated during each machine cycle under control of a restoring bail 5 and are controlled in their movements by stops 6. The sectors 3 of each unit are the actuators of an associated accumulator 7. In all forms of this tabulator, the stops 6 are controlled by perforations in record cards, which are fed automatically through the machine, and the data indicated thereon is printed by the types on type carrier 2 and accumulated in accumulators 7. In all forms of this machine, means have been provided for taking the totals from accumulators 7 and printing them on a report sheet. In all instances, the total taking operation is effected by a clockwise rocking of a total shaft 8, which, in different forms of the machine, is rocked by various means, the means indicated in the drawings being similar to the type disclosed in patent to W. W. Lasker No. 2,044,119 issued June 16, 1936. However, so far as the present invention is concerned, the particular form of total taking mechanism that is used is immaterial.

In the base mechanism shown in the drawings there are indicated card feeding and card sensing mechanisms according to the disclosure in Patent No. 2,044,119, and a total taking mechanism according to a patent to W. W. Lasker No. 2,066,406 issued January 5, 1937, in which provision is made for taking totals and grand totals. In the latter patent, totals are taken by rocking a shaft 45 (see Fig. 1 of said patent) corresponding to the front total shaft 8 of the present mechanism and grand totals are taken by rocking a shaft 170 corresponding to grand total shaft 9 of the present mechanism. As stated above, however, the particular form of total taking mechanism employed is immaterial to the present invention.

The only other mechanisms of the Powers machine that need be considered with reference to the manner of operation of the mechanism of the present invention, are the printing hammer and line spacing mechanisms. These mechanisms have been incorporated in Powers machines for many years and, therefore, a brief description of each will suffice for the purpose of the present invention.

Throughout the specification it will be understood that all shafts, levers and movable parts generally are supported on or carried by the main framework of the machine, even though such is not specifically shown or mentioned. All links and link-like elements will be considered as pivotally connected to the associated elements unless otherwise specifically stated. Certain elements consist of two parts joined together for the purpose of assembly or adjustment. Furthermore, certain elements are provided with keyways, set screws, or friction clamps for corresponding adjustments. In general, such construction is not shown, for to do so would unnecessarily complicate the drawings. Many elements, for example the several total shafts, have oscillatory movements. Suitable limit stops are provided therefor to prevent over-running, or under-running or both. Such stops will not be further mentioned or described for their existence will be tacitly assumed. In many instances spring clips, cotter pins, enlarged or riveted heads, or other fastening devices are omitted from both the drawings and the detailed description. Unless otherwise specifically mentioned, the expression "mounted on," as applied to arms, cams, etc., connotes that the element is fixed on or rigidly connected to the associated shaft. The terms "forward," "rearward," and their grammatical variations occur throughout the specification. These terms refer to the relative locations of the parts as viewed from the front of the machine. Thus, "forward" always means to the left in Fig. 1, whereas "rearward" means to the right. The adoption of these conventions will considerably shorten the detailed description without detracting from the clarity of the described mode of construction and operation.

PRINTING HAMMER MECHANISM

Figure 2:
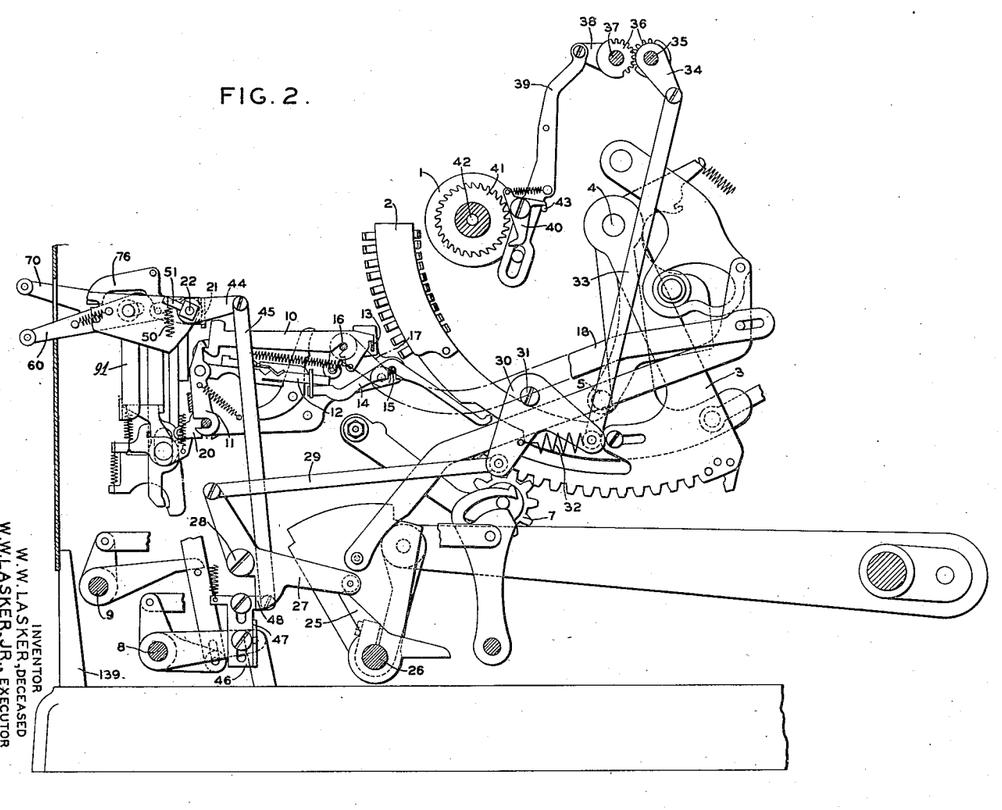
Fig. 2 is a schematic right-hand elevation of the upper portion of the tabulator of Fig. 1.

In each tabulating unit, each type carrier 2 (Fig. 2) is provided with a resiliently urged printing hammer 10 for percussively forcing the type against a report sheet supported on platen 1, in a manner similar to that disclosed in the above mentioned Patent No. 1,245,502. Hammer 10 is normally restrained by a spring-urged latch 11, to which is connected a rearwardly extending arm 12. The rearmost end of arm 12 is normally below the arcuate path of movement of a latch releasing bail 13. A lever 14, pivoted at 15, is provided for each hammer 10 and has a rearwardly extending arm cooperating with a cam surface on the associated type carrier 2 and a forwardly extending arm underlying the end of arm 12. The arrangement is such that when type carrier 2 advances sufficiently to place a significant digit in printing position, lever 14 is rocked clockwise and arm 12 is lifted into the path of movement of latch releasing bail 13. Bail 13 is mounted on a short rock shaft 16 on which is also mounted an arm 17 connected to a link 18 operable, through a lost motion connection, by the usual mechanism for operating restoring bail 5. By this arrangement, bail 13 is operated to release printing hammer latches 11 when type carriers 2 reach their printing position. A hammer latch bail 20 is pivotally mounted on the shaft supporting printing hammer latches 11 and, for a purpose described hereinafter, is arranged to be rocked when any one or more of said latches are released.

In the embodiment shown in the drawings the printing hammer mechanism of each tabulating unit is provided with a familiar form of hammer blocking device comprising a non-print bail 21 pivotally mounted on a transverse shaft 22 and settable by means hereinafter described to either of two positions. When a bail 21 is in its horizontal position, hereinafter referred to as its ineffective or "open" position, the hammers 10 associated therewith are free to swing against the types on carriers 2 when released from latches 11; whereas when a bail 21 is in its rocked position, hereinafter referred to as its ineffective or "closed" position, the rearward edge of the bail is arranged to engage the latching face of each hammer and prevent the hammers from striking the positioned types. There may be one of these bails for any one or more of the tabulating units, and, if desired, a unit may be split and a separate bail arranged for each division of the split.

LINE SPACING MECHANISM

A line spacing mechanism is provided to advance the platen after each complete line of data is printed on the report sheet. For this purpose, a cam 25, arranged to coact with the follower roller on a lever 27 pivotally mounted at 28, is mounted on the familiar fan cam rock shaft 26 which, as in all tabulators of the Powers type, is oscillated by suitable means during each machine cycle. A link 29 connects the upright arm of lever 27 to a bellcrank 30 which is pivoted at 31 and urged counter-clockwise by a spring 32. The other arm of bellcrank 30 is connected by link 33 to an arm 34 mounted on rock shaft 35. Suitable gears 36 transmit the rocking motion of shaft 35 to another rock shaft 37 on which is fixed an arm 38. A suitably guided link 39, connected to arm 38, is provided with a resiliently urged pawl 40 arranged to engage a ratchet 41 mounted on the supporting shaft 42 of platen 1. By this arrangement, when shaft 26 is rocked counter-clockwise, during the first half of a machine cycle, cam 25 releases lever 27 and permits spring 32 to rock bellcrank 30 counter-clockwise to elevate link 39, thereby permitting pawl 40 to be urged clockwise by its spring to engage a tooth on ratchet 41. In this interval, type carriers 2 are positioned and printing hammers 10 are released to effect printing. When shaft 26 is rocked clockwise, during the latter part of a machine cycle, cam 25 positively rocks lever 27 counter-clockwise thereby lowering link 39 and causing pawl 40 to advance platen 1. The usual manually settable means, indicated by stud 43, may be provided to effect the disengagement of pawl 40 and ratchet 41 and control the extent of movement of the platen during each cycle.

Means operable during non-listing operations, as hereinafter described, are provided to prevent the operation of the line spacing mechanism. For this purpose, an arm 44, mounted on shaft 22, is connected by a link 45 to a suitably guided slide 46 having a turned-over ear 47 capable of coacting with a pendant heel 48 on lever 27. When slide 46 is in its lower position, ear 47 is out of the path of movement of heel 48 so that the line spacing mechanism is free to operate as described above. However, when arm 44 is rocked to elevate slide 46, ear 47 is moved into the path of movement of heel 48. Lever 27 is thereby held against the tension of spring 32, in the position shown in Fig. 2, to prevent line spacing. In this position of the parts, the movement of cam 25 is merely an idle motion.

NON-PRINT BAIL CONTROL MECHANISM

Figures 3, 4, 5:
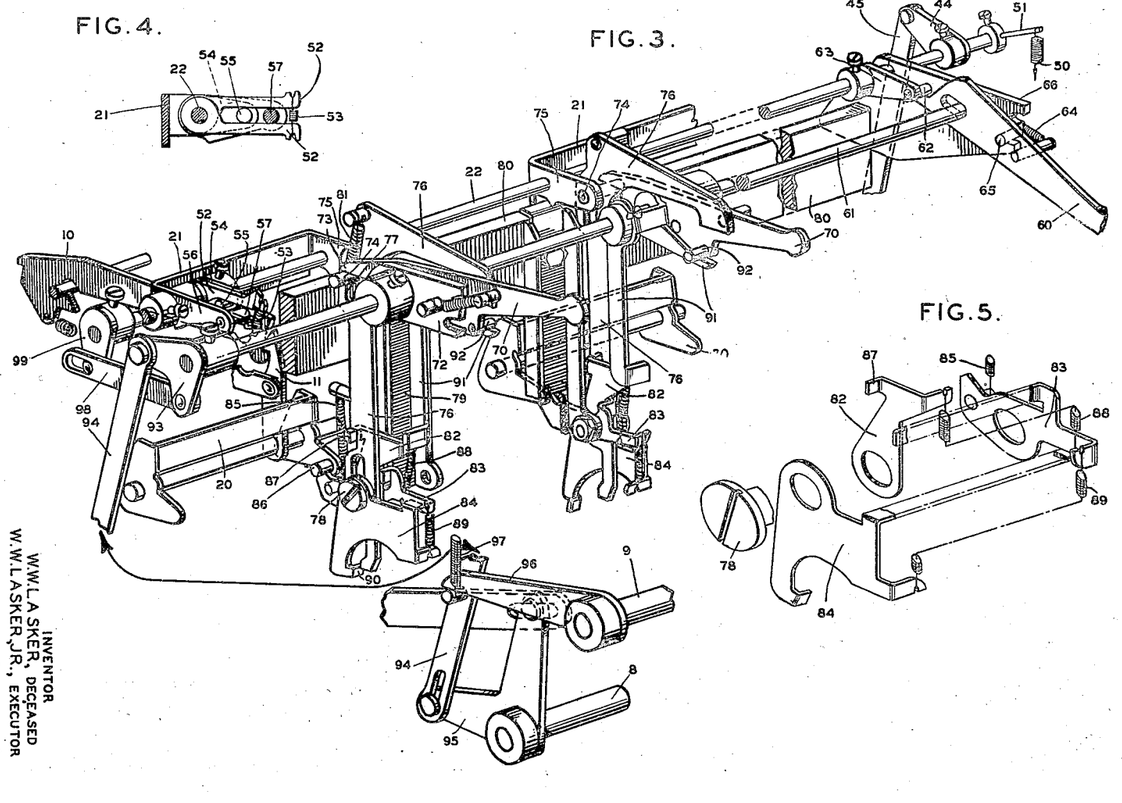
Fig. 3 is an isometric view of the tabulating unit control mechanism of Fig. 2.
Fig. 4 is a sectional elevation of the centering device of Fig. 3.
Fig. 5 is an exploded isometric view of the escapement mechanism of Fig. 3.
Figure 6:
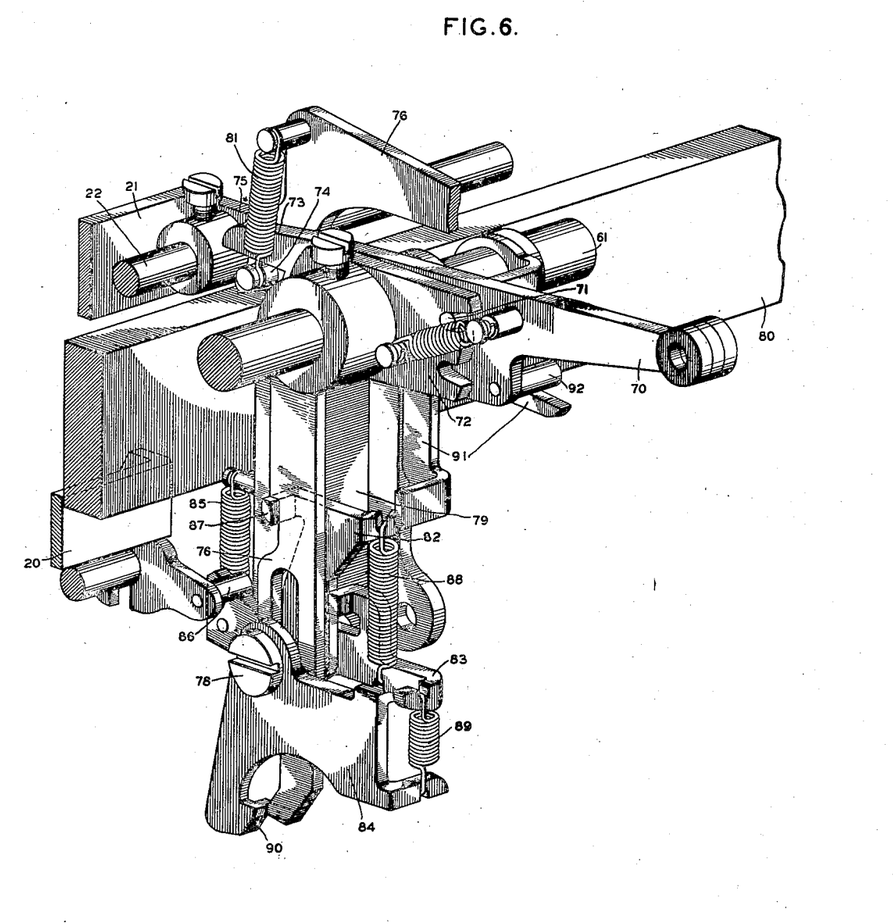
Fig. 6 is an enlarged isometric view of a portion of the control mechanism of Fig. 3.

One form of the mechanism for controlling the operation of the non-print bail 21 is shown in Fig. 3 and details thereof in Figs. 4, 5, and 6. In this arrangement, shaft 22, on which the non-print bails for each tabulating unit are pivotally mounted, is journaled in suitable bearings in the frame of the machine and is resiliently biased in a clockwise direction (Fig. 3) by a spring 50 extended from a pin 51 on the shaft to a suitable frame stud. Each bail 21 is yieldingly connected to shaft 22 by a centering device (Fig. 4) comprising a pair of arms 52, pivotally mounted on shaft 22 and connected by a light spring 53, and an arm 54 fixed to the shaft and having a stud 55 extending between arms 52. A forwardly extending arm 56 on each bail is provided with a stud 57 which also extends between arms 52. Thus, arms 52 and spring 53 tend to align bail 21 with arm 54 to place the bail in open or closed position in accordance with the setting of shaft 22.

Shaft 22 may be set in either of two positions to control listing and non-listing operations by means of a manually settable lever 60 (Fig. 3) having a handle that extends through an opening in the front cover plate of the machine. Lever 60 is provided with a slot that encompasses a suitably mounted transverse rock shaft 61 and has a rearwardly extending finger underlying a stud 62 in an arm 63 mounted on shaft 22. Lever 60 is urged rearwardly by a suitable spring 64 and is provided with a stud 65 that may engage with either of two notches cut in a plate 66 mounted on the frame of the machine. When lever 60 is set in its lower or "listing" position as shown in Fig. 3, the finger thereon rocks shaft 22 counter-clockwise to open bails 21 and condition the machine for listing operations; whereas, when lever 60 is set in its upper or "non-listing" position, spring 50 rocks shaft 22 clockwise to close bails 21 and condition the machine for non-listing operations.

In addition to the control exercised by lever 60, which is common to the non-print bails 21 of all tabulating units, each bail is provided with an individual controlling mechanism settable to either of two positions to control the operation of the associated non-print bail. When designative data is to be tabulated in a given unit, this mechanism is set to one position for controlling "Designating" printing operations, whereas when quantitative data is to be tabulated in the unit, this mechanism is set to its other position for controlling "adding" printing operations. When a unit is used for tabulating designating data in a non-listed report, this mechanism serves to hold a bail 21 open during the tabulation of the first card of a group, even though the bail is biased to closed position by lever 60, and further, serves to prevent printing during total taking cycles. For performing these functions, each tabulating unit is provided with a manually settable lever 70 that is slidably mounted on the transverse rock shaft 61 and provided with a pin 71 (Fig. 6) which may engage either of two notches in an arm 72 fast on shaft 61. Lever 70 is provided with a rearwardly extending finger 73 overlying a pin 74 fixed to a forwardly extending arm 75 of bail 21. A suitable spring urges lever 70 rearwardly so that, when set in either its upper position for controlling printing during "designating" operations or in its lower position for controlling printing during "adding" operations, its pin 71 is held locked in one of the notches on arm 72.

Cooperating with lever 70 (Fig. 3) is an inverted L-shaped slide 76 provided with two slots which guide its vertical movement. The upper slot 77 encompasses pin 74 on bail 21 and the lower slot encompasses a bolt 78 which is secured to a suitable bracket 79 mounted on a transverse frame bar 80. A spring 81, stronger than spring 53 of the centering device, connects pin 74 to a stud on slide 76 and tends to draw pin 74 to the upper end of slot 77, so that when slide 76 is held in its upper position, bail 21 is held open. Slide 76 is normally held in its upper position, by an escapement mechanism (Fig. 5) which comprises a lock pawl 82, a lever 83, and a check pawl 84, all of which are pivotally mounted on bolt 78. Lever 83 is urged clockwise by a spring 85 secured to a stud on bracket 79, and its rearward arm extends under a pin 86 in hammer latch bail 20. Lock pawl 82 is provided with a turned-over ear 87 that coacts with a cutaway shoulder on slide 76, and is resiliently urged clockwise (Fig. 3) to engaging position by a spring 88 connected to the forward end of lever 83. Check pawl 84 is urged counter-clockwise (Fig. 5) by a spring 89 connected to lever 83, and a pendant arm thereof is provided with a turned over ear 90 that is normally clear of a bent portion on the lower end of slide 76 but is arranged to move under the slide when the escapement mechanism is rocked counter-clockwise. Suitable turned over limit lugs are provided on lever 83 and pawl 84 which are adapted to engage the edges of pawl 82 and lever 83, respectively, and normally prevent relative movement of the several elements, whereby the escapement mechanism is arranged to rotate counter-clockwise as a unit when bail 20 is rocked clockwise, due to the release of a hammer latch 11.

Although lock pawl 82 normally engages the shoulder on slide 76 to hold the slide in its upper position and thereby, by means of spring 81, hold bail 21 open even though lever 60 may be set to bias the bail to its closed position, means are provided to disable the escapement when the control mechanism is set for "adding." For this purpose, a bellcrank 91, pivotally mounted on shaft 61, is provided with a horizontal arm underlying a pin 92 in lever 70 and a pendant arm having a turned-over ear that coacts with the forward edge of lock pawl 82. When lever 70 is set for "designating," bellcrank 91 hangs idly on shaft 61; whereas, when lever 70 is set for "adding," pin 92 rocks bellcrank 91 clockwise to force pawl 82 out of engagement with slide 76 and permit the slide to hang idly on pin 74. Pin 92 is also arranged to coact with the forwardly extending arm of slide 76, when lever 70 is set for "designating," to restore the slide to its upper position when shaft 61 is rocked during a total taking operation.

To operate shaft 61 during total taking cycles, a bellcrank 93 is mounted on the left end of shaft 61 and is connected by a link 94 to an arm 95 on total shaft 8. When shaft 8 is rocked for taking a total, shaft 61 is rocked counter-clockwise, whereby, in the units set for "designating," levers 70 depress pins 74 and close the associated bails 21 to prevent printing during the total taking cycle. However, when a lever 70 is set for "adding," finger 73 thereon is ineffective on bail 21 when shaft 61 is rocked and the position of the bail is determined by the setting of lever 60. When lever 60 is set for "listing," no further control is needed since bail 21 is held open by its centering device, whereas, when lever 60 is set for "non-listing," means are provided to open the bail during total taking cycles. For this purpose, the pendant arm of bellcrank 93 is connected to a rearwardly extending link 98 which is joined by a pin-in-slot connection to an arm 99 mounted on shaft 22. The arrangement is such that when lever 60 is set for "non-listing" spring 50 rocks shaft 22 clockwise to move the pin in arm 99 to the rearward end of the slot in link 98. Thus, when shaft 61 is rocked during total taking cycles, link 98 and arm 99 serve to rock shaft 22 against the tension of spring 50 whereby bails 21 are urged to open position by the associated centering devices. However, when lever 60 is set for "listing" (as illustrated in Fig. 3), the pin in arm 99 is moved to the forward end of the slot in link 98 so that subsequent rocking of shaft 61 is ineffective on shaft 22.

If desired, shaft 61 may also be rocked during grand total taking cycles, independently of total shaft 8, by an arm 96 mounted on grand total shaft 9. A suitable spring 97 on link 94 serves to restore shaft 61 and the associated mechanism to normal position at the end of each total taking cycle.

OPERATION OF NON-PRINT BAIL CONTROL MECHANISM

By means of the above described mechanism, the non-print bail of each tabulating unit may be caused to function in any one of four different ways to control four different types of printing operations, namely, 1. Non-listing designative data, i. e., to print the common designation from the first card of a group, prevent printing from the remaining cards of the group, and prevent printing during total taking cycles;
2. Non-listing quantitative data, i. e., to print only the totals of the amounts in each card group and prevent item printing;
3. Listing designative data, i. e., to print the designation from each card of a group and prevent printing during total taking cycles; and
4. Listing quantitative data, i. e., to print the amounts in each card of a group and to print the total of each group of amounts.

Figure 7:
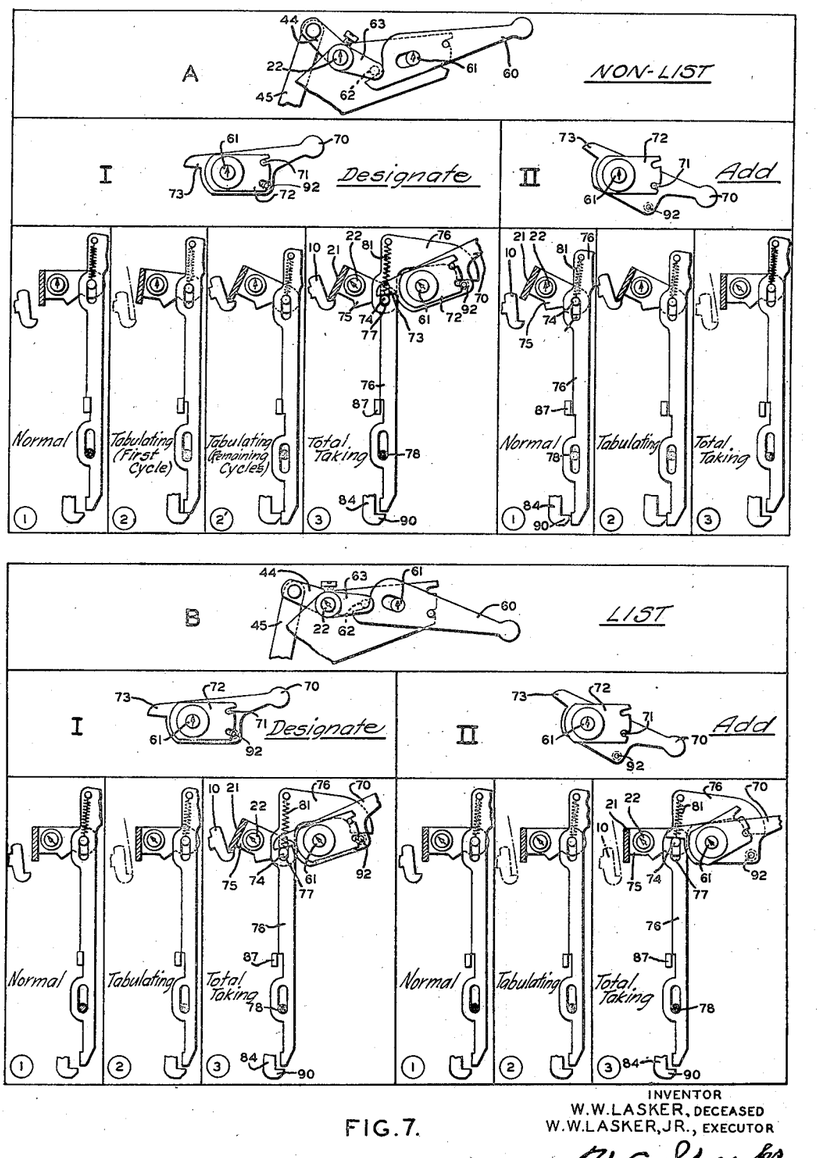
Fig. 7 shows a series of position views of the control mechanism of Fig. 3 for each of the several settings thereof.

The various settings of levers 60 and 70 for effecting these several types of operations, and the various positions of non-print bail 21 and associated elements during each type of operation, are shown in Fig. 7. As explained above, listing control lever 60 may be set in either an upper or lower position, as in A and B of Fig. 7, respectively, and when so set, each individual control lever 70 may also be set in either an upper or lower position, as in I and II of Fig. 7, respectively. This arrangement permits four combinational settings of the levers for variably controlling bail 21 during the four types of operation. For each combinational setting, the several operated positions of bail 21 and associated elements, during a run of cards, have been indicated by Arabic numerals. In each case, the normal or starting position of the mechanism is designated by 1; the position during tabulating operations, at the moment printing hammers 10 are released, by 2 and 2'; and the position during total taking operations, at the time the hammers are released, by 3. To facilitate this explanation, the relative positions of shaft 22 have been indicated by arrows; a vertical arrow to indicate when the shaft is controlled only by its spring 50, and an inclined arrow to indicate that the shaft has been rocked by lever 60 or by shaft 8 during a total taking cycle. Shaft 61 is similarly indicated by a vertical arrow to represent its normal position and its position during tabulating operations, and an inclined arrow to represent its rocked position during a total taking operation.

Operation 1

For non-listing designative data, lever 60, is set in its upper position (Fig. 7, A), and lever 70 is set in its upper position (Fig. 7, A, I). In this position of the parts, slide 76 is sustained in its upper position by ear 87 on lock pawl 82 of the escapement mechanism. Thus, even though bail 21 is urged to closed position by means of the centering device on shaft 22, spring 81, which is stronger than spring 53, retains pin 74 in the upper end of slot 77 in slide 76 to resiliently hold bail 21 in its open position thereby permitting the passage of hammers 10 and distending the centering device. This position, illustrated in Fig. 7, A, I, 1, is the normal or starting position of the mechanism for operation 1, and is the position to which the mechanism is returned at the end of each total taking operation.

When type carriers 2 are positioned under the control of the first card of a group, hammer latches 11 (Fig. 3) are rocked clockwise to release printing hammers 10 and concomitantly rock bail 20 clockwise, which in turn rocks the escapement mechanism counter-clockwise by means of pin 86. This motion moves ear 90 on check pawl 84 beneath the lower end of slide 76 and withdraws ear 87 on lock pawl 82 from engagement with the shoulder on slide 76. Thus, due to a small clearance between the lower end of slide 76 and ear 90, and since bail 21 and slide 76 are resiliently connected by spring 81, slide 76 drops downwardly under the control of the centering device until its lower end rests on ear 90 of check pawl 84, thereby rocking bail 21 slightly. This movement is sufficient to prevent the reengagement of ear 87 on lock pawl 82 with the shoulder on slide 76, when the escapement is returned to normal position, but is not sufficient to rock bail 21 to its hammer blocking position (Fig. 7, A, I, 2). Therefore, hammers 10 are free to effect printing of the information contained in the first card of the group.

When the printing hammers are returned to latched position at the end of the printing operation, hammer latch bail 20 (Fig. 3) is rocked counter-clockwise by spring 85 which concomitantly rocks the escapement mechanism clockwise. This motion moves ear 87 on lock pawl 82 against slide 76 and withdraws ear 90 on check pawl 84 from beneath the end of the slide. Since slide 76 is no longer positively upheld by the escapement mechanism, spring 81 cannot hold bail 21 against the tension of spring 53 of the centering device. Bail 21 is then rocked to its closed position by the centering device, and the lower end of slide 76 drops beneath ear 90 on check pawl 84, as shown in Fig. 7, A, I, 2'. This position of the several elements is maintained while the remaining cards of the group are passed through the machine and thus, no printing is effected under the control of these cards.

During a total taking operation, link 94 (Fig. 3) is pulled downwardly and rocks shafts 61 and 22 counter-clockwise by means of bellcrank 93, link 98 and arm 99. Rocking of shaft 22 causes the centering device to urge bail 21 to its open position. However, since lever 70 is in its upper position, rocking of shaft 61 serves to hold bail 21 in its closed position by means of finger 73 which positively depresses pin 74 on bail arm 75. Concomitantly, pin 92 on lever 70 engages the forwardly extending arm of slide 76 to raise the slide to its upper position. This movement serves to tension spring 81 and hold the slide in position to be engaged by ear 87 on lock pawl 82 when the escapement is again rocked clockwise at the end of the total taking cycle, due to the return of hammers 10. The position of the parts at the time the printing hammers are released is illustrated in Fig. 7, A, I, 3.

This position is maintained until the end of the total taking cycle. At the end of the total taking cycle, link 94 (Fig. 3) is released and shafts 61 and 22 are restored to their original position by spring 97. This motion releases bail 21 from the positive control of finger 73. Since shaft 22 has been rocked by its spring 50, bail 21 tends to remain in closed position due to the action of the centering device. However, spring 81 is now free to pull pin 74 to the upper end of the slot 77 in slide 76 and rocks bail 21 to open position against the tension of spring 53 of the centering device. The several elements are thus returned to the position illustrated in Fig. 7, A, I, 1 so that bail 21 is in position to permit printing of the information contained in the first card of the succeeding group.

Since the shaft 22 is held in non-listing position during this type of operation, link 45 (Fig. 2) is held elevated to place ear 47 of slide 46 in the path of movement of ear 48 on lever 27 and thereby prevent the operation of the line spacing mechanism during tabulating cycles. However, when shaft 22 is rocked against the tension of spring 50 during the total taking operation, link 45 is lowered to permit the line spacing mechanism to advance platen 1 one step after the total has been printed.

Operation 2

For non-listing quantitative data, lever 60 is set in its upper position (Fig. 7, A) and lever 70 in its lower position (Fig. 7, A, II). In this case, when lever 70 is set in its lower position, pin 92 thereon (Fig. 3) rocks bellcrank 91 clockwise, which, in turn, rocks lock pawl 82 counter-clockwise to positively disengage ear 87 thereon from the shoulder in slide 76, and thereby tensions spring 88. Inasmuch as spring 85 on lever 83 is stronger than spring 88, the movement of lock pawl 82 does not effect check pawl 84, and the check pawl is retained in its former position in which ear 90 is out of the path of movement of the lower end of slide 76. Thus, since bail 21 is urged to hammer blocking position due to the setting of lever 60, bail 21 is closed by the centering device, and slide 76 drops to its lower ineffective position as shown in Fig. 7 A, II, 1. In this setting, slide 76 hangs idly on pin 74 of bail arm 75. Spring 53 (Fig. 4) which connects arms 52 of the centering device is so arranged that, although it may be overcome by spring 81 when that spring is tensioned, it is of sufficient strength to rock bail 21 in accordance with the setting of shaft 22 even though the weight of slide 76 is added to bail 21.

This position is maintained during tabulating cycles so that the hammers 10 are prevented from printing items. Obviously, the escapement mechanism will be rocked by pin 86 on hammer latch bail 20 when hammers 10 are released by latches 11 during each machine cycle. However, this movement is without any bearing as slide 76 is fully dropped and ear 90 on check pawl 84 merely moves against the lower end of slide 76 and thereby stretches spring 89 (Fig. 7, A, II, 2). Thus, the escapement mechanism is ineffective during operation 2 and bail 21 remains in closed position during tabulating operations, as shown in Fig. 7, A, II, 2.

When a total is taken during this type of operation, shafts 61 and 22 are rocked in the manner indicated above in operation 1. However, since lever 70 is set in its lower position, finger 73 is ineffective on pin 74 of bail arm 75 when shaft 61 is rocked. Bail 21 is, therefore, rocked to open position by its centering device due to the rocking of shaft 22, and thereby permits printing of the total of the group (Fig. 7, A, II, 3). Since slide 76 is supported by pin 74 on bail 21, the slide is elevated to its upper position when shaft 22 is rocked but it drops immediately at the end of the total taking operation since bellcrank 91 continues to hold lock pawl 82 disengaged from the shoulder in slide 76. Thus, after a total taking operation, the mechanism is returned to the position shown in Fig. 7, A, II, 1 to block printing from the cards of the next group.

During this type of operation, the line spacing mechanism is operated in the same manner as in operation 1, that is, disabled during tabulating cycles and enabled during the total taking operation.

Operation 3

For listing designative data, lever 60 is set to its lower position (Fig. 7, B) and lever 70 is set to its upper position (Fig. 7 B, I). This setting positions the mechanism as shown in Fig. 7, B, I, 1 in which bail 21 is held in open position by the centering device. This position is maintained during tabulating cycles to allow hammers 10 to effect printing of information from each card of the group. During this type of operation, the escapement mechanism operates during each cycle, but as bail 21 is resiliently held in open position by the centering device, slide 76 hangs idly on pin 74 and the movement of the escapement mechanism is ineffective (Fig. 7, B, I, 2).

During a total taking operation, shaft 61 is rocked by means of link 94 and bellcrank 93 so that finger 73 on lever 70 rocks bail 21 to closed position to prevent the printing of totals as in Fig. 7, B, I, 3. As an incident to a total taking operation, pin 92 raises slide 76 to its upper position where it is held by lock pawl 82, but since the slide hangs idly on pin 74, this movement is without effect.

During this type of operation, link 45 (Fig. 2) is held in its lower position, due to the setting of lever 60, and retains ear 47 on slide 46 out of the path of movement of lever 27. Thus, the line spacing mechanism operates to advance platen 1 through one step during each tabulating and total taking cycle.

Operation 4

For listing quantitative data, lever 60 is set in its lower position (Fig. 7, B) and lever 70 in its lower position (Fig. 7, B, II). During this type of operation bail 21 is under the sole control of shaft 22 and the centering device (Fig. 7, B, II, 1). Thus, under control of the centering device, bail 21 remains open during tabulating operations to permit the printing of each item (Fig. 7, B, II, 2). During a total taking operation, finger 73 of lever 70 is ineffective on bail 21 when shaft 61 is rocked, and bail 21 remains in open position to permit printing of totals (Fig. 7, B, II, 3). In this case, the line spacing mechanism operates in the same manner as above for operation 3, that is, to advance platen 1 during tabulating and total taking cycles.

When a different operation is to be performed by a given tabulating unit during a subsequent run of cards, the control levers are set for the new operation and the hammer bail controlling mechanism is automatically conditioned to perform the new operation due to the normal operation of the tabulator. For example, when a unit which has been used for performing operation 4 is to be used for performing operation 1, levers 60 and 70 are shifted from the positions indicated in Figs. 7, B and 7, B, II, respectively, to the positions indicated in Figs. 7, A and 7, A, I, respectively. When the new run is started, the tabulator will perform a total taking operation in the manner disclosed in Patent No. 2,044,119. As the machine has been cleared at the end of the preceding run, this total taking operation is blank and no printing occurs. However, at the end of this blank total taking operation, due to the new setting of levers 60 and 70, the printing bail controlling mechanism is shifted to the normal or starting position for performing operation 1 as indicated in Fig. 7, A, I, 1 in the manner described in operation 1, wherein the mechanism is shifted from the position of Fig. 7, A, I, 3 to that of Fig. 7, A, I, 1 at the end of each total taking operation. The same condition prevails whenever the control mechanism of a unit is shifted from one type of operation to another, that is, the blank total taking operation initiated at the beginning of the run serves to condition the unit for the new operation.

When the control mechanism is used in machines having total taking mechanisms other than that described in Patent No. 2,044,119, for example, in machines in which totals are taken under control of special cards, it is customary to insert total taking control cards at the beginning of each run to insure that the machine is cleared for the new run. Thus, regardless of the type of machine on which the present invention is used, a blank total taking operation is initiated at the beginning of each run of cards and the control mechanism may be arbitrarily set to control any type of operation.

COMBINATIONAL OPERATION OF NON-PRINT BAIL CONTROL MECHANISM

The description thus far has dealt with the operation and control of one non-print bail 21. It will be tacitly understood, however, that the printing hammers of any tabulating unit may be provided with mechanism similar to lever 70 and its associated elements, and be placed under control of listing lever 60. Then, when the information on a given run of cards is to be listed, lever 60 is set in its lower position, and levers 70 of the units in which designative data is to be tabulated are set in their upper position for controlling operation 3, whereas, levers 70 of the units in which quantitative data is to be tabulated are set in their lower position for controlling operation 4. The resulting report sheet comprises a list of groups of designations, each designation having the associated amount printed on the same line, and the totals of each group of amounts are printed on a separate line at the end of the group. The designating units are blocked during total taking operations since the total of the designations would be meaningless. When, however, the information on a given run of cards is to be non-listed, lever 60 is set in its upper position, and levers 70 of the units in which designative data is to be tabulated are set in their upper position for controlling operation 1, whereas, lever 70 of the units in which quantitative data is to be tabulated are set in their lower positions for controlling operation 2. The resulting report sheet then comprises a list of group designations in which the totals of the quantitative data of each group are printed on the same line with the associated group designation.

With the present arrangement, it is obvious that any tabulator unit may be used as a designating unit or an adding unit, as desired, according to the set up of the information on the cards, or according to the type of report sheet required, thereby rendering the tabulator more flexible and adaptable to a variety of different types of accounting problems.

NON-PRINT BAIL CONTROL MECHANISM (FORM 2)

It has been found that the bobbing movement of levers 70 during total taking cycles is frequently a source of annoyance to operators in certain types of accounting systems. In addition, due to the location of levers 60 and 70, it is possible that an inadvertent movement on the part of an operator may dislodge the levers during the operation of the machine. To eliminate these difficulties, the construction of mechanism for controlling the above described functions of the non-print bails has been improved as shown in Figs. 8–13, inclusive.

In this form of the invention bails 21 are pivotally mounted on shaft 22 which is urged clockwise by spring 50 (Fig. 12), as before. Each bail is resiliently urged to open or closed position in accordance with the setting of shaft 22 by a link 100 (Figs. 9 and 10) which is connected to a forwardly extending arm on bail 21 and is guided at its lower end by an arm 123 pivoted on a stud 124 mounted in a bracket 122 on transverse frame bar 80. Link 100 is joined, by a spring 101 and stud 102, to a slide 103 having a slot 104 adapted to encompass a pin 105 in an arm 106 fixed on shaft 22. Stud 102 projects into a slot 107 in link 100 to permit relative movement of the slide and link. Slide 103 (see also Fig. 14) is urged downwardly by a spring 103A, extended between a stud on the slide and a stud on a check pawl 117 of an escapement mechanism, hereinafter described, but may be held in its upper position against the tension of spring 103A by a lock pawl 116 of the escapement mechanism.

Shaft 22 may be set for "listing" or "non-listing" under control of a push button 108 (Fig. 8), slidably arranged in a suitable housing 109 that is mounted in a control panel 139 on the front of the machine. The button 108 has a rearwardly extending stem 110 arranged to coact with a turned-over ear 111 on a lever 112 pivoted at 113. The upper end of lever 112 coacts with a roller on an arm 114 fixed to shaft 22. When button 108 is pulled out (non-listing), spring 50 (Fig. 12) urges shaft 22 clockwise to close bails 21, whereas, when button 108 is pushed in (listing), lever 112 rocks shaft 22 counter-clockwise to open the bails.

When button 108 is set for non-listing, means are provided to rock shaft 22 to its listing position during total taking cycles independently of the button, to permit printing in the tabulating units in which quantitative data is to be tabulated, i. e., in the units set for "adding." For this purpose, an arm 125 mounted on total shaft 8 is provided with a roller adapted to coact with the forward edge of lever 112. Thus, when shaft 8 is rocked during a total taking cycle, arm 125 rocks lever 112 clockwise to rock shaft 22 counter-clockwise and open bails 21. An arm 126 mounted on grand total shaft 9 serves a similar function during grand total taking cycles.

To retain bail 21 in its open position to effect printing of the common designation from the first card of a group when button 108 is set for non-listing, slide 103 (Figs. 9 and 10) is held in its upper position by an ear 115 on a lock pawl 116, that coacts with a shoulder on slide 103. Lock pawl 116 is an element of an escapement mechanism (see also Fig. 14) that also comprises a check pawl 117, having a turned over ear 118 arranged to coact with the lower end of slide 103, and a lever 119 operable by a projection 120 on hammer latch bail 20. This escapement is pivotally mounted on a stud 121 in bracket 122, and is similar in function and manner of operation to that described in the first form of the invention. As in the previously described escapement mechanism, lock pawl 116 is urged clockwise by a spring 116A, extended from an ear on the lock pawl to an ear on lever 119; check pawl 117 is urged counter-clockwise by the above mentioned spring 103A but is provided with a rearward extension coacting with a stud 119B on lever 119 to limit the movement of the check pawl and retain ear 118 out of the path of slide 103 when lock pawl 116 is engaged therewith; and lever 119 is provided with a pendant extension 119C adapted to coact with an ear 138 on lock pawl 116 to rock the lock pawl counter-clockwise when lever 119 is rocked by projection 120 on hammer latch bail 20. The entire assembly is urged clockwise by a spring 119A, extended from stud 119B to a stud on frame bar 80. It will be noted that spring 119A is substantially stronger than spring 103A, so that the rearward end of lever 119 is held against projection 120 and urges hammer latch bail 20 counter-clockwise against hammers 11. The arrangement of the escapement mechanism is such as to result in unitary movement of elements 116, 117, 119, when operated by projection 120 on bail 20, and to permit individual movement of lock pawl 116 when the mechanism is set for "adding," as hereinafter described.

To prevent printing during total taking cycles in the tabulating units in which designative data is to be tabulated, i. e., in the units set for "designating," an interponent 127 (Figs. 9 and 10), having a limit stud 128 arranged to bear against the forward edge of link 100, is pivoted on the lower end of link 100 and is urged counter-clockwise by a spring 129 connected to the pendant arm of a bell-crank 130 pivotally mounted on stud 124. The horizontal arm of bell-crank 130 is provided with a stud 131 overlying the upper end of interponent 127. When total shaft 8 is rocked during a total taking cycle, an arm 132, mounted thereon and having a turned-over ear that coacts with a pin on the pendant arm of bell-crank 130, rocks the bell-crank clockwise and, by means of stud 131 and interponent 127, lowers link 100 to close bail 21. Due to slot 107 in link 100, it is apparent that bail 21 will be closed under these conditions, regardless of the position of shaft 22.

When a unit is used for tabulating quantitative data ("adding"), two of the above described operations that occur during "designating" operations must be altered: first, the closing of bail 21 which occurs during total taking cycles when either listing or non-listing designative data, and second, the opening of bail 21 which occurs during the tabulation of the first card of each group when non-listing designative data. That is, when a unit is used either to list or non-list quantitative data, the non-print bail must be open, not closed, during total cycles, and when a unit is used to non-list quantitative data, the non-print bail must be closed, not open, during the tabulation of the first card of each group.

Figure 8:
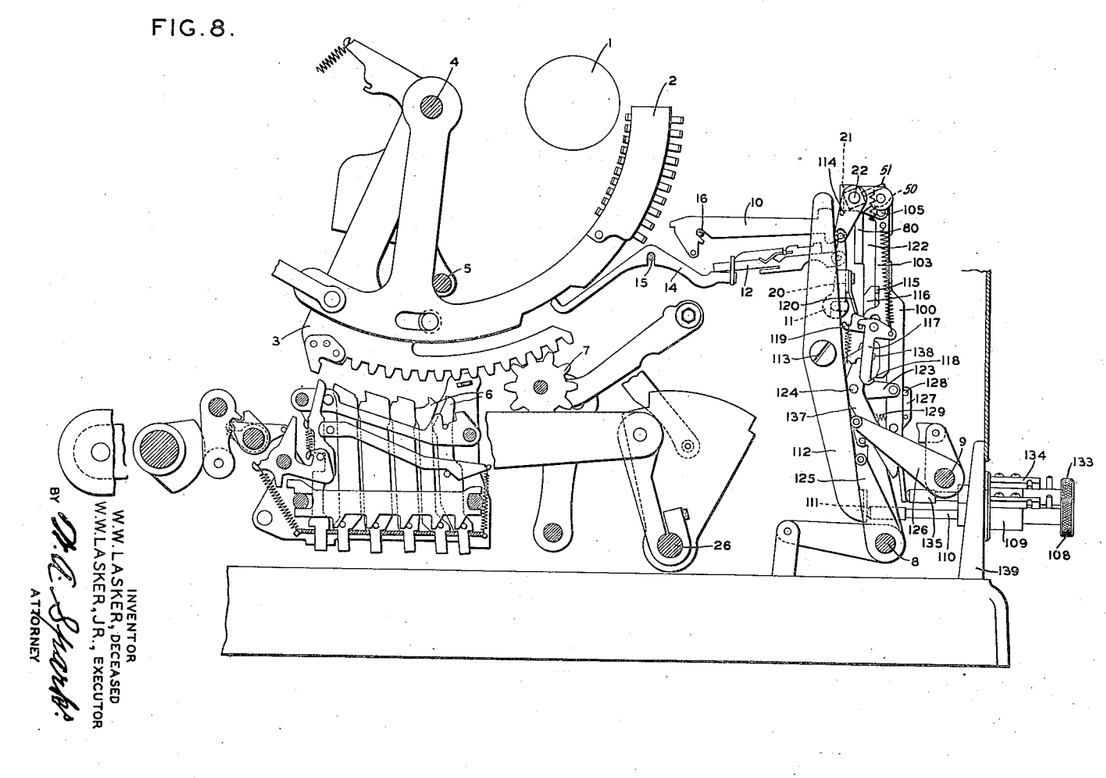
Fig. 8 is a schematic left-hand elevation of the upper portion of the tabulator of Fig. 1 equipped with a modified form of the invention.

For this purpose, the control mechanism of each tabulating unit is provided with an individual push button 133 (Figs. 9 and 10), slidably arranged in a suitable housing 134 in control panel 139, having a rearward stem 135 adapted to coact with a turned-over ear 136 on interponent 127. Ear 136 overlies the lower end of a lever 137, pivoted on stud 124, the upper arm of which coacts with a turned over ear 138 on lock pawl 116 (see also Fig. 11). When button 133 is pushed in, stem 135 rocks interponent 127 clockwise to move the upper end thereof out of the path of movement of the horizontal arm of bell-crank 130. Thus, when total shaft 8 is rocked, bell-crank 130 is ineffective to lower link 100, and bail 21 is either held open, when the machine is set for "listing," due to the control of shaft 22 by button 108, or opened, when the machine is set for "non-listing," due to the action of arm 125 on shaft 8 (Fig. 8). Thus, in a unit used either to list or non-list quantitative data, the non-print bail is held open during total cycles. At the same time that interponent 127 is rocked, ear 136 thereon rocks lever 137 clockwise, which through ear 138, rocks lock pawl 116 counter-clockwise to disengage ear 115 from the shoulder in slide 103. Thus, when the machine is set for "non-listing" slide 103 is released and drops downwardly, to the limit of slot 104, and, in turn, lowers link 100 to close bail 21 which prevents printing when the first card of a group is tabulated. Thus, in a unit used to non-list quantitative data, the non-print bail is in closed position during the tabulation of the first card of each group, as well as during the tabulation of the remaining cards of each group. Thus, when button 133 is pushed in, the mechanism is set for controlling "adding" printing operations, whereas, when the button is pulled out, the mechanism is set for controlling "designating" printing operations.

OPERATION OF NON-PRINT BAIL CONTROL MECHANISM (FORM 2)

Figure 11:
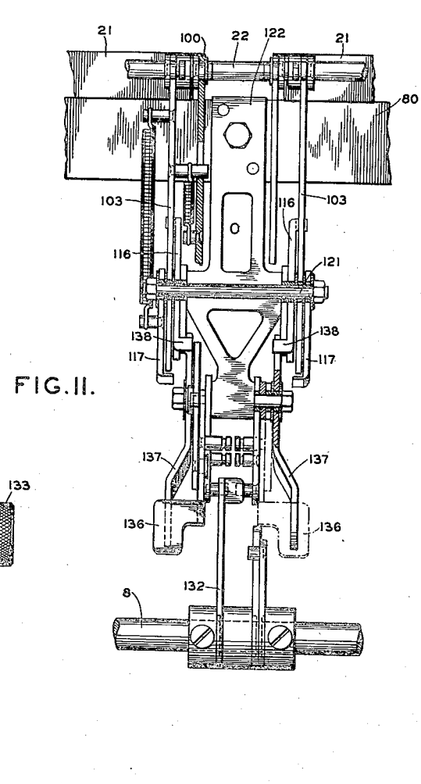
Fig. 11 is a front elevation, partly in section, showing an arrangement of the control mechanism of Figs. 8-10 for adjacent or split tabulating units.

The arrangement of the second form of non-print bail control mechanism is somewhat more compact than that of Form 1, described above, and is particularly adapted for controlling adjacent or split tabulating units, when space is limited, as shown in Fig. 11.

By means of the present mechanism, the non-print bail of each tabulating unit may be controlled, as in the above described embodiment of the invention, to function in either of four different ways to effect the four different types of printing operations referred to above, as follows:

*Operation 1*

Figures 9, 14:
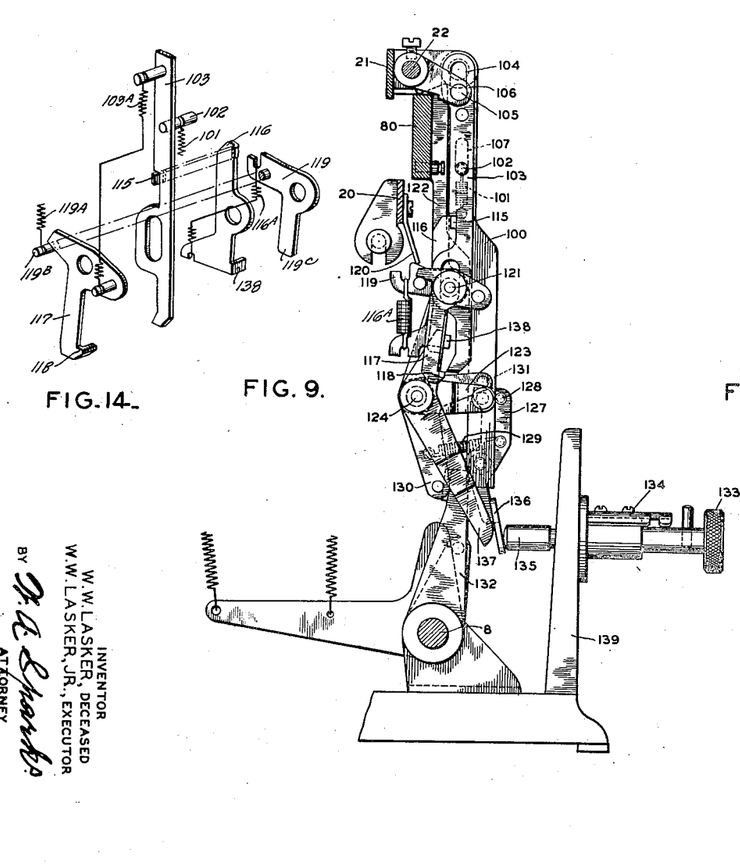
Fig. 9 is a sectional elevation of a portion of the control mechanism of Fig. 8.
Fig. 14 is an exploded isometric view of the escapement mechanism of Fig. 10.
Figure 10:
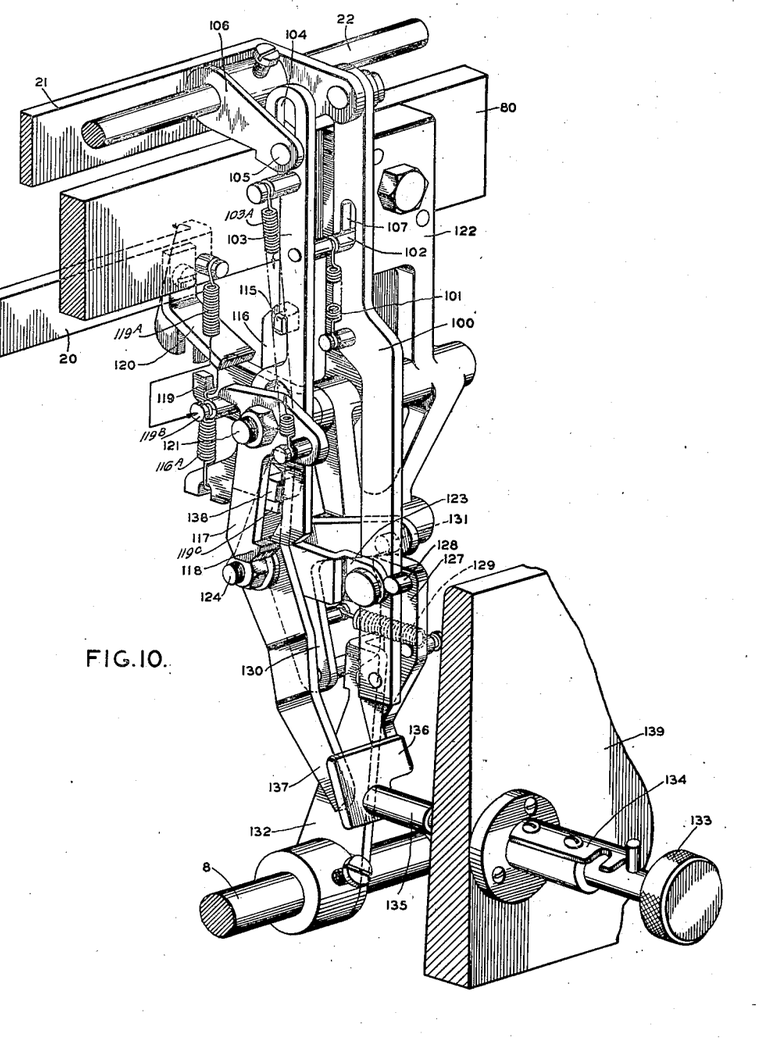
Fig. 10 is an isometric view of the mechanism of Fig. 9.

For non-listing designative data, buttons 108 and 133 are pulled out and the mechanism is normally in the position shown in Figs. 8, 9, and 10, in which bail 21 is held open by link 100 which, in turn, is held in its upper position by lock pawl 116 through slide 103, stud 102, and spring 101.

When the first card of a group is tabulated, hammer latch bail 20 is rocked clockwise and, through projection 120, rocks the escapement mechanism counter-clockwise to release lock pawl 116 from slide 103, thereby permitting slide 103 and link 100 to be moved downwardly by spring 103A. However, since check pawl 117 acts in unison with lock pawl 116, ear 118 moves under the lower end of slide 103 before ear 115 on lock pawl 116 releases. Thus, slide 103 and link 100 only move a distance equal to the lead between ears 115 and 118. Inasmuch as this movement is insufficient to close bail 21, the designation on the first card is printed. After hammers 10 have fired, spring 119A on lever 119 serves to restore hammer latch bail 20 to its normal position, and to rock the escapement mechanism clockwise to release slide 103 from ear 118 on check pawl 117. Due to the previous movement of slide 103, ear 115 is unable to engage the shoulder on the slide and, therefore, spring 103A moves slide 103 and link 100 downwardly to the limit of slot 104 and thus, serves to rock bail 21 to closed position. This position is maintained during the tabulation of the remaining cards of the group.

When shaft 8 (Fig. 8) is rocked during the total taking cycle, arm 125 thereon, through lever 112, rocks shaft 22 and arm 106 (Figs. 9 and 10) counter-clockwise to raise slide 103 against the tension of spring 103A. This movement by means of stud 102, spring 101 and link 100, tends to open bail 21. However, arm 132 on total shaft 8, by means of bell-crank 130 and interponent 127, serves to pull link 100 downwardly to retain bail 21 in closed position to prevent printing during the total taking cycle. Although bail 21 is held closed during the total taking cycle, slide 103 is latched by ear 115 on lock pawl 116 when it reaches its highest position, so that, when shaft 8 is restored at the end of the total taking cycle, slide 103 serves to open bail 21 and thereby restore the mechanism to the position shown in Figs. 9 and 10 in preparation for the tabulation of the next group of cards.

Since the mechanism of this form of the invention operates to control shaft 22 in the same manner as the previously described form of control mechanism, it is apparent that the line spacing mechanism will operate, in the same manner, namely, during tabulating and total taking cycles when the machine is set for "listing" and only during total taking cycles when the machine is set for "non-listing," and, therefore, need not be discussed further.

*Operation 2*

For non-listing quantitative data, button 108 is pulled out and button 133 is pushed in. In this position of the parts, stem 135 on key 133, by means of ear 136 and lever 137 disables lock pawl 116 and permits slide 103 and link 100 to drop downwardly under control of spring 103A, whereby bail 21 is rocked to its closed position to prevent printing during the tabulation of the item cards of each group.

When a total is taken, shaft 22 is rocked counter-clockwise as in operation 1 to elevate slide 103, and, since bellcrank 130 is now ineffective on interponent 127, serves to raise link 100 and open bail 21 to permit the printing hammers to effect printing of the total of the quantitative data during the total taking cycle. When shaft 8 is restored at the end of the total taking cycle, pawl 116, which is held rocked by button 133, is ineffective for latching slide 103 and permits slide 103 and link 100 to drop downwardly, under control of spring 103A, to close bail 21 and prevent printing during the tabulation of the item cards of the succeeding group.

Operation 3

For listing designative data, button 108 is pushed in and button 133 is pulled out. In this position of the parts, stem 110 on button 108 (Fig. 8) holds lever 112 and shaft 22 rocked against the tension of spring 50, and, by means of arm 106 (Fig. 10), slide 103, stud 102, spring 101, and link 100, serves to hold bail 21 in open position to permit the printing of the information contained in each card. During this type of operation, the escapement mechanism is not needed to retain slide 103 in raised position and, therefore, operates idly during each cycle.

Inasmuch as button 133 is pulled out, interponent 127 lies in the path of movement of bellcrank 130 so that the rocking of shaft 8 and arm 132 during the total taking cycle serves to lower link 100 and close bail 21 to prevent printing during the total taking cycle.

Operation 4

For listing quantitative data, buttons 108 and 133 are pushed in. In this position of the parts, button 108, as in operation 3, serves to hold bail 21 in open position to permit printing of the information in each card, and in addition since interponent 127 is out of the path of movement of bellcrank 130, serves to hold bail 21 open to permit printing during total taking cycles.

COMBINATIONAL OPERATION OF NON-PRINT BAIL CONTROL MECHANISM (FORM 2)

Figure 12:
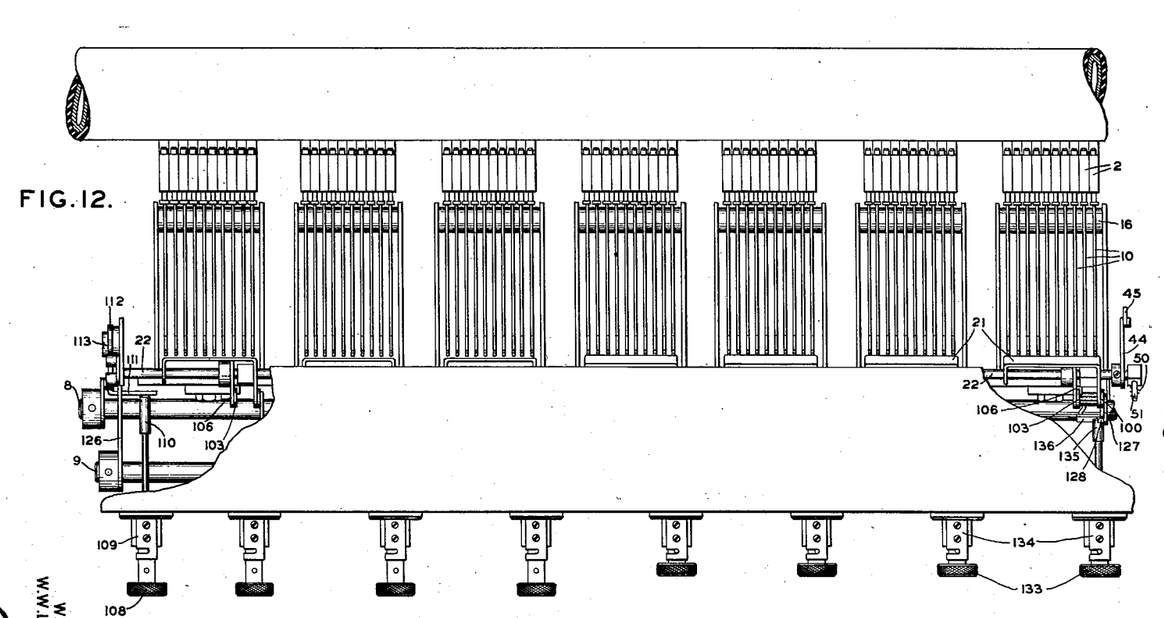
Fig. 12 is a plan view of adjacent tabulating units equipped with the second form of the invention and set for a non-listing operation.
Figure 13:
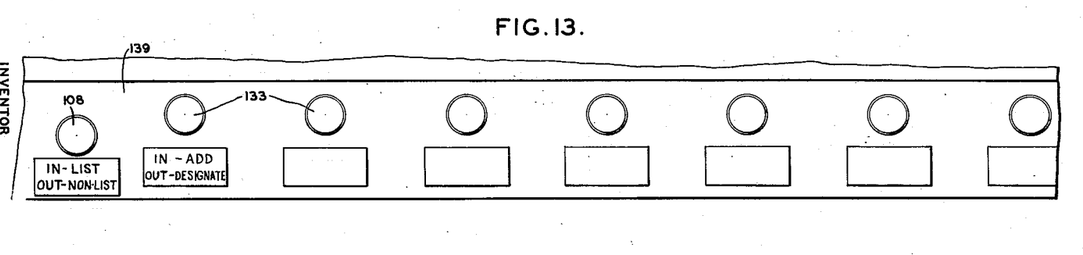
Fig. 13 is a front elevation of the control panel of Fig. 12.

Obviously, when a plurality of tabulating units on a machine are equipped with non-print bails and each bail is provided with the form of control mechanism disclosed, the control mechanism may be set, as in Form 1, for controlling the preparation of listed and non-listed report sheets. That is, when the information on a given run of cards is to be non-listed, button 108 is pulled out. Then buttons 133 of the adding units are pushed in for controlling operation 2 and buttons 133 of the designating units are pulled out for controlling operation 1. The resulting report sheet then comprises a list of group designations in which the totals of the quantitative data of each group are printed on the same line with the associated group designations. Fig. 12 shows the setting of buttons 108, 133 and non-print bails 21 in their normal or starting position, for preparing a non-listed report, in a machine having seven tabulating units in which the three left-hand units are set for designating and the other four, for adding. When the machine is used for listing, button 108 is pushed in and buttons 133 are either pulled out or pushed in depending on whether the associated unit is to be used for designating or adding, respectively. The resulting report sheet comprises a list of groups of designations, each designation having the associated amounts printed on the same line, and the totals of each group of amounts are printed on a separate line at the end of the group.

While there are above described but a limited number of embodiments of the invention, it is possible to produce still other embodiments without departure from the inventive concept above disclosed, and it is, therefore, desired that only such limitations shall be imposed on the appended claims as are stated therein.

What is claimed as new, and desired to be secured by Letters Patent, is:

1. In a machine for tabulating data contained in successive groups of records and having total taking control means operative after the tabulation of each group, the combination of a plurality of printing hammers and means to operate said hammers during each machine cycle, a non-print bail for the printing hammers, said bail being settable to a closed or an open position and arranged when closed to prevent the operation of the hammers, and means for controlling the operation of the bail, said last recited means comprising a first control means resiliently connected to the bail and settable to a plurality of positions, said control means being arranged in a first of said positions to open the bail and in a second of said positions to close the bail, impositive means to hold the control means in its second position, means operable by the total taking control means to set the control means in its first position against the action of the impositive means whereby the bail is urged to open position when a total is taken, a second control means operable by the total taking control means and arranged when operated to close the bail whereby the bail is closed against the tension of the first control means when a total is taken, additional means resiliently connected to the bail and movable by the second control means to a position to urge the bail to open position, means to retain said additional means in said last mentioned position whereby the bail is opened after the operation of the total taking control means, and means operable by the printing hammer operating means to disable said retaining means whereby the bail is restored to the control of the first control means after printing is effected in the cycle following the operation of the total taking control means.

2. The invention set forth in claim 1 in combination with means to render said second control means and said retaining means ineffective, whereby the non-print bail is controlled to prevent the operation of the printing hammers during all cycles except total taking cycles.

3. The invention set forth in claim 1 in combination with means to retain said first control means in its first position against the action of said impositive means, whereby the non-print bail is controlled to permit the operation of the printing hammers during all cycles except total taking cycles.

4. The invention set forth in claim 1 in combination with means to render said second control means and said retaining means ineffective and means to retain said first control means in its first position against the action of said impositive means, whereby the non-print bail is controlled to permit the operation of the printing hammers during each machine cycle.

WILLIAM W. LASKER, JR.,
Executor of the Estate of William W. Lasker, Deceased.